US012608375B2

(12) United States Patent
Palkar et al.

(10) Patent No.: US 12,608,375 B2
(45) **Date of Patent: \*Apr. 21, 2026**

(54) STATIC APPROACH TO LAZY MATERIALIZATION IN DATABASE SCANS USING PUSHED FILTERS

(71) Applicant: Databricks, Inc., San Francisco, CA (US)

(72) Inventors: Shoumik Palkar, San Francisco, CA (US); Alexander Behm, San Francisco, CA (US); Mostafa Mokhtar, San Francisco, CA (US); Sriram Krishnamurthy, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/160,850

(22) Filed: Jan. 27, 2023

(65) Prior Publication Data

US 2024/0256539 A1      Aug. 1, 2024

(51) Int. Cl.
G06F 16/2453          (2019.01)
G06F 16/22            (2019.01)

(52) U.S. Cl.
CPC ...... G06F 16/24539 (2019.01); G06F 16/221 (2019.01)

(58) Field of Classification Search
CPC .......................... G06F 16/24539; G06F 16/221
See application file for complete search history.

(56) References Cited

U.S. PATENT DOCUMENTS

| | | | | |
|---|---|---|---|---|
| 11,126,622 | B1 * | 9/2021 | Hazel | G06F 16/24539 |
| 11,537,616 | B1 * | 12/2022 | Lin | G06N 20/00 |
| 11,609,910 | B1 * | 3/2023 | Papakonstantinou | G06F 16/24539 |
| 2015/0269202 | A1 * | 9/2015 | Ku | G06F 16/24542 707/715 |
| 2018/0075105 | A1 * | 3/2018 | Chavan | G06F 16/221 |
| 2019/0102411 | A1 * | 4/2019 | Hung | G06F 16/21 |
| 2019/0104175 | A1 * | 4/2019 | Balkesen | G06F 16/27 |
| 2019/0378028 | A1 * | 12/2019 | Chaudhuri | G06N 5/048 |
| 2019/0384765 | A1 * | 12/2019 | White | G06F 16/24545 |

(Continued)

*Primary Examiner* — Jensen Hu

(74) *Attorney, Agent, or Firm* — Fenwick & West LLP

(57)          ABSTRACT

Disclosed herein is a method for determining whether to apply a lazy materialization technique to a query run. The method includes receiving a request to perform a new query in a columnar database containing a plurality of columns. A step in the method includes accessing a set of data in a column of the plurality of columns based on the query. The method includes generating an input to a machine-learned model comprising characteristics of the set of data in the column. From the machine-learned model, the method includes generating a likelihood value indicative of whether a filter of a first portion of the set of data in the column has greater efficiency than a download followed by a filter of the set of data in the column. The method further includes comparing the likelihood value to a threshold value. Based on the comparison, the method includes filtering the first portion of the set of data before downloading the set of data if the likelihood value is equal to or above the threshold value.

20 Claims, 7 Drawing Sheets

(56)                    References Cited

U.S. PATENT DOCUMENTS

| | | | |
|---|---|---|---|
| 2019/0392068 A1* | 12/2019 | Wen .................. | G06F 16/24545 |
| 2022/0083547 A1* | 3/2022 | Thiyagarajan ...... | G06F 16/2393 |
| 2023/0141190 A1* | 5/2023 | Ma .................... | G06F 16/24539 |
| | | | 707/714 |
| 2024/0126604 A1* | 4/2024 | Sen ....................... | G06F 9/5016 |

* cited by examiner

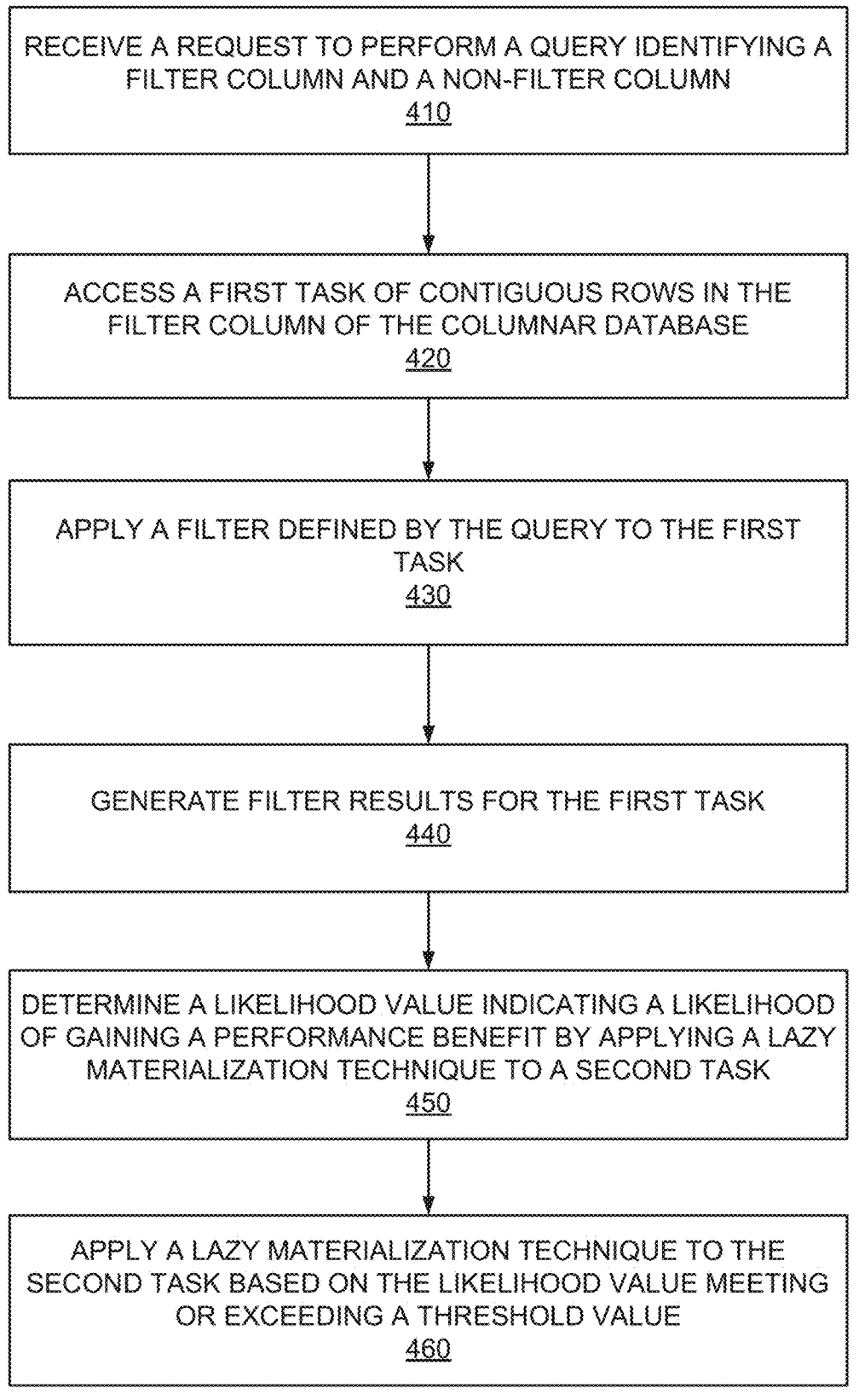

RECEIVE A REQUEST TO PERFORM A QUERY IDENTIFYING A
FILTER COLUMN AND A NON-FILTER COLUMN
410

ACCESS A FIRST TASK OF CONTIGUOUS ROWS IN THE
FILTER COLUMN OF THE COLUMNAR DATABASE
420

APPLY A FILTER DEFINED BY THE QUERY TO THE FIRST
TASK
430

GENERATE FILTER RESULTS FOR THE FIRST TASK
440

DETERMINE A LIKELIHOOD VALUE INDICATING A LIKELIHOOD
OF GAINING A PERFORMANCE BENEFIT BY APPLYING A LAZY
MATERIALIZATION TECHNIQUE TO A SECOND TASK
450

APPLY A LAZY MATERIALIZATION TECHNIQUE TO THE
SECOND TASK BASED ON THE LIKELIHOOD VALUE MEETING
OR EXCEEDING A THRESHOLD VALUE
460

RECEIVE A REQUEST TO PERFORM A NEW QUERY
510

ACCESS A SET OF DATA BASED ON THE QUERY
520

GENERATE AN INPUT TO A MACHINE-LEARNED MODEL COMPRISING CHARACTERISTICS OF THE SET OF DATA
530

GENERATE A LIKELIHOOD VALUE FROM THE MACHINE-LEARNED MODEL
540

COMPARE THE LIKELIHOOD VALUE TO A THRESHOLD VALUE
550

FILTER THE FIRST PORTION OF THE SET OF DATA BEFORE DOWNLOADING THE FULL SET OF DATA IF THE LIKELIHOOD VALUE IS EQUAL TO OR ABOVE THE THRESHOLD VALUE
560

*FIG. 5*

500

STATIC APPROACH TO LAZY MATERIALIZATION IN DATABASE SCANS USING PUSHED FILTERS

TECHNICAL FIELD

The disclosed configuration relates to accessing data in columnar databases for query processing.

BACKGROUND

Cloud-based object storage systems enable companies, individuals, and other entities to store and access large datasets. Multiple cloud-based storage systems are commonly used, such as AMAZON Web Services, GOOGLE Cloud Platform, IBM Cloud Services, MICROSOFT AZURE, and other largescale cloud service providers. Typically, a structured query language (SQL) encoded query is provided to a data management system. SQL is an example of a declarative language for talking to databases. A SQL query may be run on a columnar dataset including a multitude of columns and rows. SQL queries typically query over rows in a columnar data storage. For example, Apache Parquet is an open-source, column-oriented data storage frequently used in cloud storage. However, running a query on a columnar database frequently requires fetching entire columns of the database. This is an expensive and inefficient task. If columns are very large, fetching the entire columns and then performing filtering may be unnecessarily expensive if the filter returns no values. Additionally, in cases where a query is expensive, the cloud-based storage system may throttle the query and slow down the run time further. There is lacking, inter alia, an efficient technique for running queries on cloud-based columnar datasets.

BRIEF DESCRIPTION OF THE DRAWINGS

FIG. 4 is a flowchart illustrating a method for applying lazy materialization, in accordance with some embodiments.

FIG. 5 is a flowchart illustrating a method for performing lazy materialization, in accordance with some embodiments.

Figure 1:
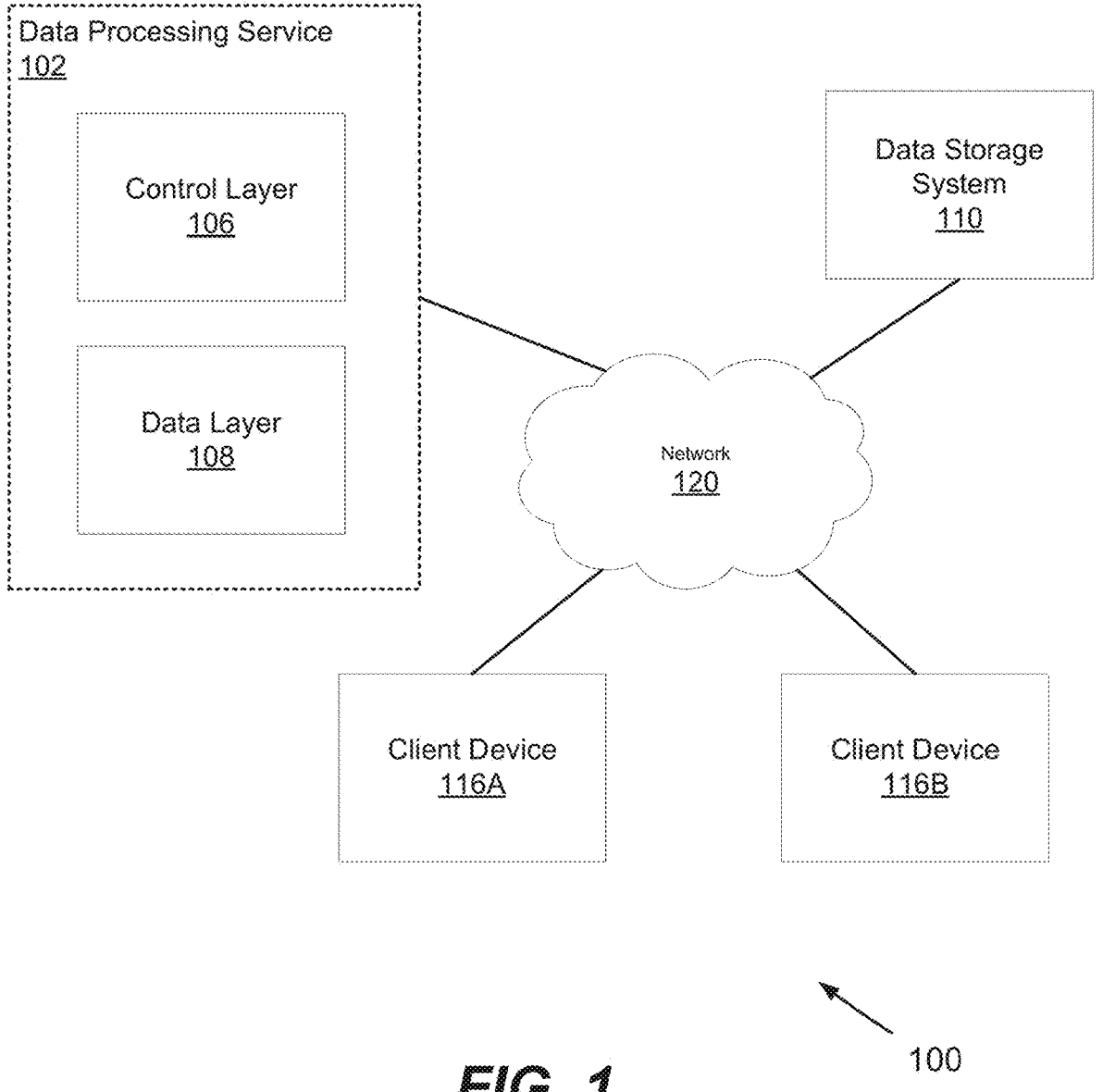
FIG. 1 is a high-level block diagram of a system environment for a data processing service, in accordance with an embodiment.

The figures depict various embodiments of the disclosed configurations for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Disclosed are configurations (e.g., method, system, and/or non-transitory computer readable storage medium comprising stored instructions) for an alternative approach to running queries on data sets. In one example embodiment, the configuration includes receiving a request to perform a query on a columnar database comprising a plurality of columns. The query identifies a filter column and a non-filter column out of the plurality of columns. The configuration accesses a first task of contiguous rows in the filter column of the columnar database from a cloud-based object storage. The first task may comprise any number of contiguous rows. The configuration applies a filter defined by the query to the first task. The configuration generates filter results for the first task. Filter results may include a run-time, an estimated query expense, and more. Based on the filter results for the first task, the configuration determines a likelihood value indicating a likelihood of gaining a performance benefit by applying a lazy materialization technique to a second task of the query. The second task is associated with a second set of contiguous rows of the filter column. Based on the likelihood value meeting or exceeding a threshold value, the configuration applies the lazy materialization technique to the second task based on the likelihood value meeting or exceeding a threshold value.

In another example embodiment, a configuration includes receiving a request to perform a new query in a columnar database having a plurality of columns. Based on the query, the method accesses a set of data in a column of the plurality of columns. The configuration generates an input to a machine-learned model comprising characteristics of the set of data in the column. The characteristics may include a size of an associated dictionary encoding, a size of the data file, and a number of unique values in the column. An associated dictionary encoding may comprise encoding a numerical value associated with a key, such as "1" for "California," with an associated numerical value correlated with the appearance of the key (e.g., 1:50 for "California" appearing 50 times in a column or dataset). The configuration generates a likelihood value from the machine-learned model, the likelihood value indicative of whether a filter of a first portion of the set of data in the column has greater efficiency than a download followed by a filter of the set of data in the column. The configuration compares the likelihood value to a threshold value. If the likelihood value is equal to or above the threshold value, the configuration filters the first portion of the set of data before downloading the set of data.

Example System Environment

Figure (FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing system 102 may receive requests from users of client devices 116 to perform one or more data processing functionalities on data stored, for example, in the data storage system 110. The requests may include query requests, analytics requests, or machine learning and artificial intelligence requests, and the like, on data stored in the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, a portion of a stored data set, data for executing a query). In one embodiment, the data storage system 110 includes a distributed storage system for storing data and may include a commercially provided distributed storage system service (e.g., cloud-based storage system). Thus, the data storage system 110 may be managed by a separate entity than an entity that manages the data processing service 102, or the data management system 110 may be managed by the same entity that manages the data processing service 102.

The client devices 116 are computing devices that display information to users and communicate user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Control Layer Architecture

Figure 2:
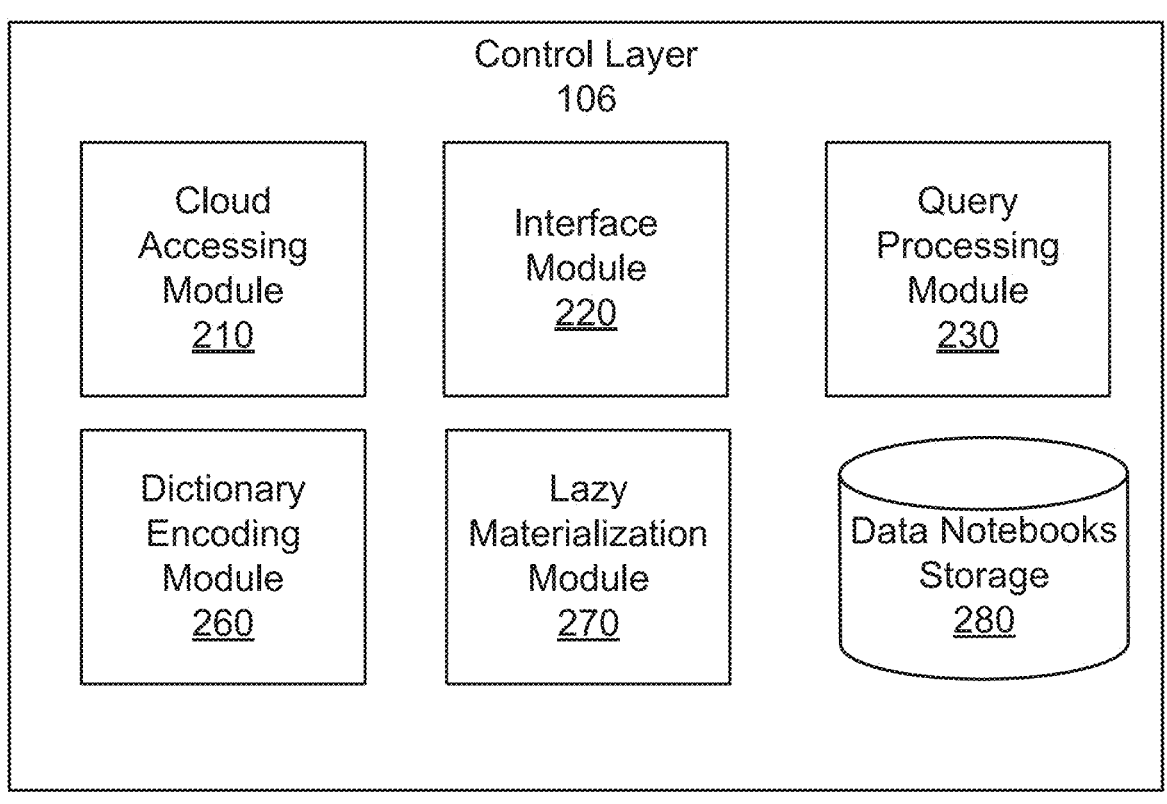
FIG. 2 illustrates a block diagram of an architecture of a data storage system, in accordance with some embodiments.

FIG. 2 is a block diagram of an architecture of a control layer 106, in accordance with an embodiment. In one embodiment, the control layer 106 includes a cloud accessing module 210, an interface module 220, a query processing module 230, a dictionary encoding module 260, a lazy materialization module 270, and a data notebooks storage 280.

The interface module 220 provides an interface and/or a workspace environment where users of client devices 116 (e.g., users associated with tenants) can access resources of the data processing service 102. For example, the user may retrieve information from data tables associated with a tenant and submit data processing requests such as query requests on the data tables through the interface provided by the interface module 220. The interface provided by the interface module 220 may include notebooks, libraries, experiments, and queries submitted by the user. In one embodiment, a user may access the workspace via a user interface (UI), a command line interface (CLI), or through an application programming interface (API) provided by the interface module 220.

For example, a notebook associated with a workspace environment is a web-based interface to a document that includes runnable code, visualizations, and explanatory text. A user may submit data processing requests on data tables in the form of one or more notebook queries. The user provides code for executing the one or more queries and indications such as the desired time for execution, number of cluster worker nodes for the queries, cluster configurations, a notebook version, input parameters, authentication information, output storage locations, or any other type of indications for executing the queries. The user may also view or obtain results of executing the queries via the workspace.

The control layer 106 includes a query processing module 230. The query processing module 230 may receive an encoded query from client devices 116. The encoded query may be SQL encoded. The query may be a simple request to determine the presence of a value in a data table. The query may request to return all values from the data table that include or correspond to a desired value. The query could be a request for a data transaction or a request to determine the presence of a given value in the data. A complex query may be determined to be expensive, meaning that the estimated run-time for performing the query is large.

The query processing module 230 receives requests to execute one or more queries received from users through, for example, the workspace environment. In one embodiment, the one or more queries can include data processing operations such as data definition statements that create or modify the structure of database objects (e.g., DROP TABLE, DROP SCHEMA, CREATE DATABASE), data manipulation statements that add, change, or delete data from existing data tables (e.g., UPDATE, INSERT INTO, COPY INTO), query and data retrieval statements (e.g., Query, SELECT, VALUES), database management statements to manage data tables stored in the data storage system 108, and the like. The query processing module 230 provides the queries to the data layer 108 such that the jobs can be executed by one or more clusters and obtains results of executing the jobs. The query processing module 230 may provide the results to the lazy materialization module 270.

The query processing module 230 may produce filters to apply to data tables in response to a query. In some embodiments, the query processing module 230 produces a filter to determine the presence of a value in a data table. The query processing module 230 may produce a filter for columns in a data table that have an associated dictionary encoding. Given a query, the query processing module 230 may produce a filter to perform a task associated with the query. The query processing module 230 may generate a filter associated with each column in a dataset. Filters from the query processing module 230 may be used to cancel requests for certain columns if the filter returns no relevant data from a column. The query processing module 230 orders filters based on their estimated selectivity, in some embodiments. For example, the filter module 230 may apply filters to cached columns first. For filters that rely on multiple columns as input, the query processing module 230 applies filters that rely on the least number of input columns first. The query processing module 230 applies less expensive filters first. For example, filters that rely on integer values are less expensive than string or Regular expression (Regex) filters, so integer filters are applied before string and Regex filters. The query processing module 230 may generate filters to run on dictionaries generated by the dictionary encoding module 260.

Figure 3:
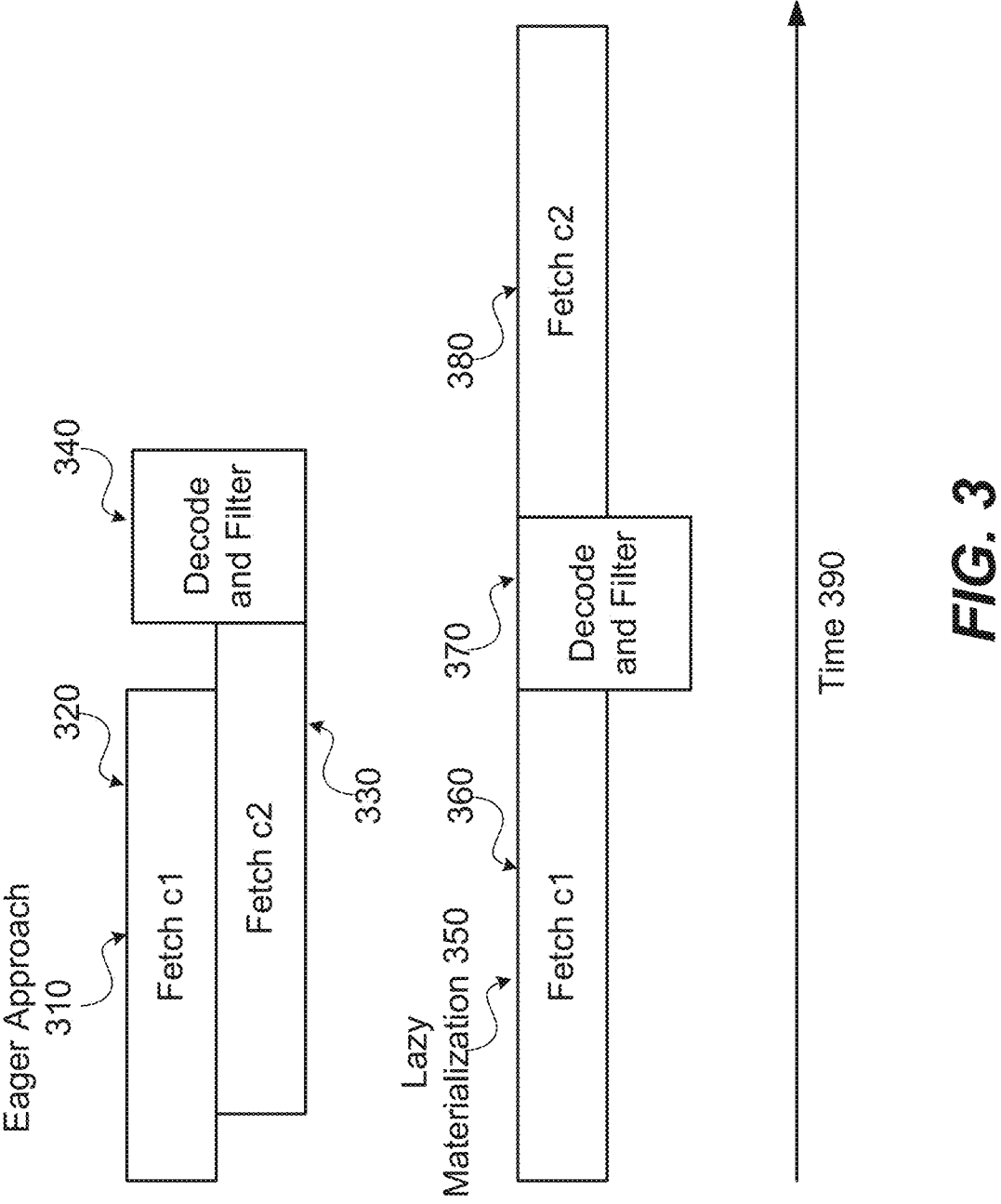
FIG. 3 illustrates a block diagram of an eager approach and a lazy materialization approach, in accordance with some embodiments.

The control layer 106 further includes a lazy materialization module 270. The lazy materialization module 270 enables a lazy materialization technique. For example, the lazy materialization technique may manage a query associated with a columnar database as depicted over time and further described with FIG. 3. In FIG. 3, given a query concerning two or more columns in the columnar database, the lazy materialization technique 350 fetches a first column 360. The first column 360 is decoded and filtered 370. Based on values kept from the filtered first column, the lazy materialization technique 350 fetches a second column 380. In cases where at least some or all of the first column 360 is discarded after filtering and decoding 370, the lazy materialization technique is determined to increase the efficiency of the query. After some or all of the first column 360 is discarded from filtering and decoding 370, only the portions of the second column 380 that correspond with the non-discarded portions of the first column 360 are fetched. Comparatively, the eager technique 310 as shown in FIG. 3 fetches both a first column 320 and a second column 330 and subsequently decodes and filters both columns 340. The lazy materialization technique 350 reduces the decoding and filtering demands if much or all of the first column 360 is discarded. Further, the lazy materialization technique 350 may eliminate the need to fetch the second column 330, which provides a significant increase in speed performance, particularly when fetching data from a cloud-based object storage.

The lazy materialization module 270 may be configured to manage user-defined thresholds for a likelihood, or probability, (e.g., a likelihood score or value that may be numerically defined). The lazy materialization module 270 may also be configured to generate likelihoods, or probabilities. In some embodiments, the lazy materialization module 270 generates a likelihood that applying the lazy materialization technique will increase the efficiency of evaluating a query on a dataset. The lazy materialization module 270 may use a machine learning model to generate likelihood estimates. The machine learning model may be trained on a dataset of columns and dictionary sizes with known run times for various queries. Leveraging the likelihood data, the lazy materialization module 270 may evaluate whether it would be more expensive if none or little of the first column 360 is discarded after decoding and filtering 370. If none or little of the first column 360 is discarded, then all or most of the second column 380 is fetched based on rows in the second column 380 that are associated with the remaining values of the first column 360. Therefore, to prevent increasing the expense of running queries, at least two approaches may be employed by the lazy materialization module 270.

Figure 6:
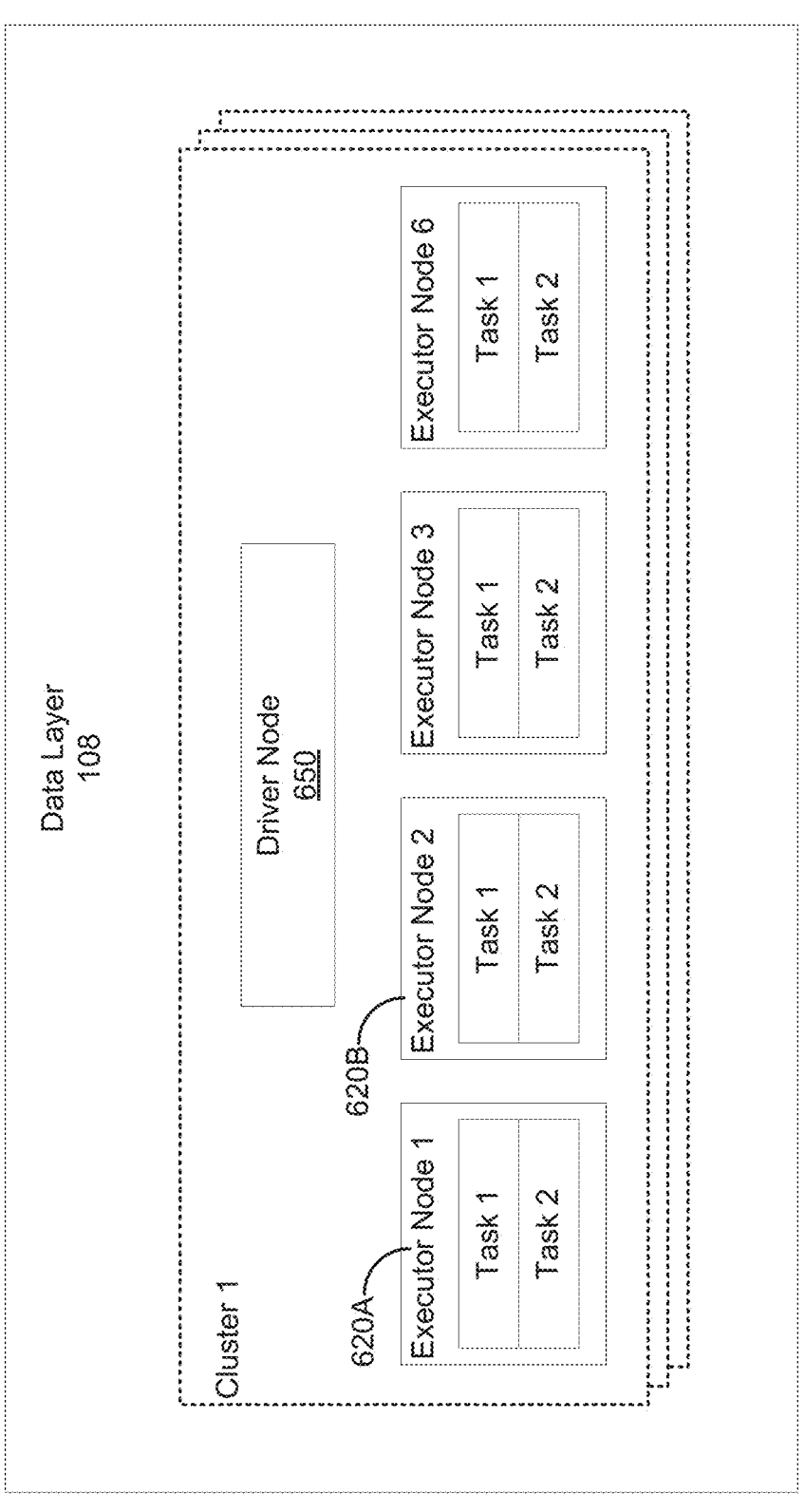
FIG. 6 illustrates a block diagram of a control layer, in accordance with some embodiments.

Turning to FIG. 6, the lazy materialization module 270 may further be structured with data layers 108 for creating and executing queries on tasks. FIG. 6 is a block diagram of an architecture of a data layer 108, in accordance with an embodiment. In some embodiments, the data layer 108 includes driver node 650 and worker pool including multiple executor nodes 620. The driver node 650 receives one or more jobs associated with a query for execution and provides job stages to executor nodes 620 in the form of tasks. The driver node 650 may receive task results from the executor nodes 620 of the worker pool, and assemble task results into complete query results, and the like.

The worker pool includes any appropriate number of executor nodes 620 (e.g., 4 executor nodes, 12 executor nodes, 253 executor nodes, and the like). An executor node 620 of the worker pool includes one or more execution engines for executing one or more tasks of a job stage. In one embodiment, an execution engine performs single-threaded task execution in which a task is processed using a single thread of at least one central processing unit (CPU). The executor node 620 distributes one or more tasks for a job stage to the one or more execution engines and provides the results of the execution to the driver node 650. A task may be a subset of the column of interest. In one example embodiment, each task is 10, 100, or 200 rows of a column. The executor nodes 620 may split dictionary-encoded columns into multiple tasks.

The data layer 108 may also include an allocation system (not shown) for autoscaling using file access or cache usage. For example, the allocation system may increase or decrease a task size based on executor node 620 usage.

Example of Adaptive Approach to Applying Lazy Materialization

An adaptive approach for lazy materialization is illustrated by an example process 400 in FIG. 4. The data processing service 102 receives 410 a request to perform a query identifying a filter column and a non-filter column in a columnar database having a plurality of columns. The query may be encoded as a SQL query. The query may request all corresponding rows in the non-filter column that correspond to a value of interest in the filter column.

In the process 400, the data processing service 102 accesses 420 a first task of contiguous rows in the filter column of the columnar database. The data processing service 102 may apply the lazy materialization technique or the eager technique to the first task of the query. In some embodiments, the first task is accessed, or fetched, from a cloud-based object storage. The query processing module 230 applies 430 a filter defined by the query to the first task. The filter is applied to a first task from the filter column of the columnar database. The filter may involve identifying a value of interest and discarding rows that are not associated with the value of interest. The data processing service 102 generates 440 filter results for the first task. The filter results include rows from the filter column that positively correspond with the query. In some embodiments, the filter results include only rows from the filter column that correspond to a value of interest. The filter results include a percentage of the first task that was discarded, in some embodiments. The filter results may also include a run-time for filtering the first task.

Continuing, the data processing service 102 determines 450 a likelihood value indicating a likelihood of gaining a performance benefit by applying 460 a lazy materialization technique to a second task. The likelihood value may be generated using the filter results from the first task and a machine learning model (e.g., the machine learning model generated by the lazy materialization module 270) that was trained on a variety of features including, for example, at least one of: a number of rows or files per task, a number of requests per row group, and a size of each request. The cost model may be trained on a plurality of query runs with known filter results and estimated run times. The filter results are input to the machine learning cost model, and a likelihood value is determined. The cost model may determine the likelihood value based on an estimated run time as calculated by equations (EQs) 1 and 2 below.

$$EstRuntime = \tag{EQ. 1}$$
$$FractionFilterBytes \times P_{Success} + \text{Penalty} \times (1 - P_{Success})$$

$$UseLazyMaterialization = EstRuntime < 1.0 \tag{EQ. 2}$$

Referring to equation 1, $P_{Success}$ may represent a likelihood of success from utilizing the lazy materialization technique as indicated by the percentage of row groups that are discarded by filtering the first column. In some embodiments, $P_{Success}$ is used alone as a likelihood value. The likelihood value is compared against a threshold as depicted in equation 2. Equation 2 may be modified, for example, to a threshold of 0.5. If $P_{Success} \geq 0.5$, given a threshold likelihood of 0.5, then the lazy materialization approach may be used in a subsequent task. In other embodiments, $P_{Success}$ is used along with other variables to determine the likelihood value, such as show in equation 1. In equation 1, Fraction-FilterBytes accounts for an estimated factor by which the lazy materialization speeds up the process of running the query on the columnar dataset. The FractionFilterBytes variable may increase based on a fewer quantity of bytes fetched for filtering, indicating a higher speed-up of the query run. The Penalty variable, as used in equation 1, accounts for an estimated factor by which the lazy materialization approach slows down the process of running the query on the columnar dataset. In some embodiments, the Penalty variable is a fixed value for when lazy materialization fails, such as when no rows are discarded after filtering the first column. In some embodiments, the Penalty variable is calculated based on a quantity of rows remaining after filtering the first column. In this case, the Penalty may outweigh the benefit of applying the lazy materialization approach as determined by the FractionFilterBytes variable. The two variables, FractionFilterBytes and Penalty factor for the potential benefit and the potential penalty of applying the lazy materialization approach to subsequent tasks, in the adaptive approach.

The calculated likelihood value is compared to a likelihood threshold in the lazy materialization module 270. The likelihood threshold may be a user-defined minimum value. If the likelihood value is below the likelihood threshold, the lazy materialization technique 350 is not applied to a second task. The second task is associated with a set of contiguous rows of the filter column, in some embodiments. If the likelihood value meets or exceed the likelihood threshold, the lazy materialization technique 350 is applied to the second task.

The process 400 may be iterative. For example, the process may run the second task of the query and filter results may be generated. Filter results characterize the run-time, percentage of data discarded, and features of filtering the second task. A likelihood value is determined based on the filter results of the second task. The likelihood value indicates a likelihood of gaining a performance benefit by applying the lazy materialization technique to a third task of the query. The third task may be associated with a third set of contiguous rows of the filter column. If the likelihood value meets or exceeds the user-defined threshold value, the lazy materialization technique is applied to the third task. The process 400 may perform the first task using lazy materialization or not using lazy materialization based on user input. In some embodiments, the process 400 performs the first task using the static technique described below and, based on filter results from the first task, either performs lazy materialization for a subsequent task or not.

Example of Static Approach to Applying Lazy Materialization

In an alternate embodiment, a static approach is illustrated by an example process 500 in FIG. 5. Unlike the adaptive approach, the static approach does not utilize filter results from previously performed tasks of a query to determine whether to utilize the lazy materialization technique. The static approach is therefore particularly useful for the first task of the query in which filter results indicating performance of previous tasks are not available. In many cases a query will only require performing a single task. For example, if a query may be assigned to be handled by multiple processors that run synchronously, then each processor may only handle one task to complete the query. Accordingly, use of the static approach to determine whether to apply the lazy materialization technique may have an immensely beneficial impact on performance, as blindly applying or not applying lazy materialization to the first task may result in a longer, less-efficient run time.

Experimentation shows that the regression of lazy materialization depends on a variety of factors: number of files per task, number of requests per row or row group, and size of each request. The cost model for the static approach takes these factors into account to produce a binary decision of whether to utilize lazy materialization. In some embodiments, the cost model may differ depending on the object-based cloud storage that is being used.

In the static approach, the data processing service 102 receives 510 a request to perform a new query in a columnar database having a plurality of columns. The request may come from a client device 116. The query may be encoded as a SQL query. The data processing service 102 accesses 520 a set of data based on the query. For example, the set of data may include the factors described above, such as the number of files per task, number of requests per row or row group, and size of each request. The set of data may also include a size of the columns, the size of the dictionary encodings of the columns, a number of rows, a number of filter columns, a number of non-filter columns, and the like.

The data processing service 102 generates 530 an input to a machine-learning model based on the set of data accessed based on the query. For example, the machine-learning model may be trained on characteristics of the previously performed queries, such as a number of rows, a number of filter columns, a number of non-filter columns, a number of requests per row, a size of the query, and the like, as well as the known run-time for filtering a first portion of a column and a known run-time for downloading the column followed by filtering the column, in some embodiments.

The machine-learned model takes the input and generates a likelihood value indicating a likelihood of gaining a performance benefit by applying a lazy materialization technique to a first task of the query. For example, the likelihood value is indicative of whether applying a filter to the filter columns prior to downloading the non-filter columns has a greater efficiency than a downloading both the filter and non-filter columns prior to applying the filter to the filter columns. The likelihood value is therefore a predictor for whether there will be a benefit from using lazy materialization. The likelihood may be calculated, in part, based on a size of the column or the size of a dictionary encoding of the column. In some embodiments, the likelihood value corresponds to an estimated run-time for the filter of the first portion of the set of data in the column. The likelihood value may be indicative of whether applying the lazy materialization technique 350 has a greater efficiency than an eager approach 310.

The likelihood value is compared to a threshold value. The threshold value may be a user-defined likelihood threshold, although it also may be a machine-learned threshold based on machine-learning observations of the likelihood success of efficiency. If the likelihood value is below the threshold value, the lazy materialization technique 350 is not applied. Instead, the eager approach 310 may be applied and the full data set downloaded before applying a filter. If the likelihood value is determined to be above the threshold value, the first portion of the set of data is filtered 560 before downloading the full set of data. The lazy materialization technique 350 is applied if the likelihood value is above the threshold value.

The static approach to lazy materialization may be hybridized with the adaptive approach. For example, the static approach, may be used for determining whether to use lazy materialization on a first task or first wave of tasks of a query, after which the adaptive approach may be used on subsequent tasks. That is, filter results generated from the first task may be used to apply the adaptive approach to subsequent tasks of the query. Filter results may include at least a run-time, percentage of the data that was discarded, and an estimated cost of the query. The adaptive approach may be used to generate a second likelihood value indicating whether applying the lazy materialization technique may increase the efficiency of the subsequent task of the query. For example, the second likelihood value may indicate whether a filter of a second portion of a set of data in a second column has a greater efficiency than a download followed by a filter of the set of data in the second column. The second likelihood is compared to the threshold value. If the second likelihood is equal to or above the threshold value, the second portion of the set of data is filtered before downloading the full set of data.

Example Computing System Architecture

Figure 7:
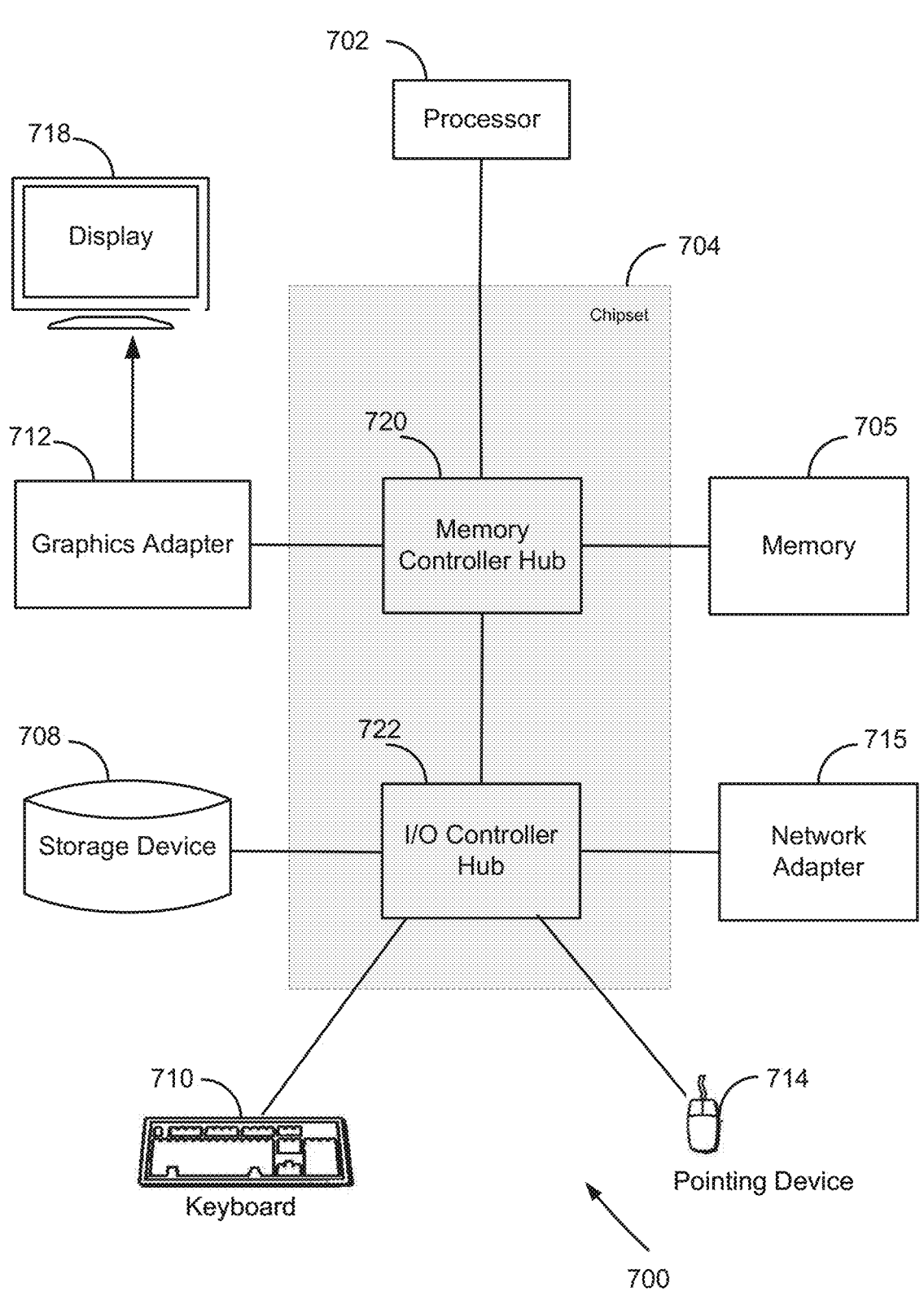
FIG. 7 is a diagram of an example computing device architecture in accordance with one embodiment.

FIG. 7 is a block diagram of an example computer 700 suitable for use in running a query on a columnar dataset, in accordance with an embodiment. The example computer 700 includes at least one processor 702 coupled to a chipset 704. The chipset 704 includes a memory controller hub 720 and an input/output (I/O) controller hub 722. A memory 705 and a graphics adapter 712 are coupled to the memory controller hub 720, and a display 718 is coupled to the graphics adapter 712. A storage device 708, keyboard 710, pointing device 714, and network adapter 715 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 705 holds instructions and data used by the processor 702. The pointing device 714 is a mouse, track ball, touch-screen, or other type of pointing device, and may be used in combination with the keyboard 710 (which may be an on-screen keyboard) to input data into the computer system 700. The graphics adapter 712 displays images and other information on the display 718. The network adapter 715 couples the computer system 700 to one or more computer networks, such as network 120.

The types of computers used by the processing entities of FIG. 1 can vary depending upon the embodiment and the processing power required by the entity. For example, data processing service 102 might include multiple blade servers working together to provide the functionality described. Furthermore, the computers can lack some of the components described above, such as keyboards 710, graphics adapters 712, and displays 718.

Additional Considerations

The disclosed configurations provide example benefits including an increased efficiency of processing a query for a dataset. In some embodiments, a first column contains a value of interest but a large amount of data in the first column is determined to be irrelevant to the value of interest and subsequently discarded. Only the rows corresponding to the value of interest are kept. The corresponding rows in a second column are then retrieved. In such an embodiment, the lazy materialization technique increases the efficiency of the query. Rather than retrieving both columns and subsequently filtering both columns, one column is filtered and a portion of the second column is then retrieved. Additionally, in one approach to lazy materialization, whether to apply the technique depends on the output of a machine learning model trained on a plurality of datasets and query results including run-time. The machine learning model determines whether to apply the technique to a first task of a dataset. In a second approach to lazy materialization, after each task a likelihood value is determined based on filter results of the task. Based on the likelihood value being above a threshold, the lazy materialization technique is applied for a subsequent task. These two approaches, in separate ways, allow for increased efficiency of query processing.

The foregoing description of the embodiments have been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope be limited not by this detailed description, but rather by any claims that issue on an application based hereon. Accordingly, the disclosure of the embodiments is intended to be illustrative, but not limiting, of the scope of the disclosed embodiments, which is set forth in the following claims.

What is claimed is:

1. A method comprising:

receiving a request to perform a new query in a columnar database having a plurality of columns;

accessing, as a first task, a set of data based on the query, the set of data accessed based on identifying a value of interest to filter the plurality of columns;

generating an input to a machine-learned model based on the set of data, wherein the input comprises at least one of a number of files per task, a number of requests per row, and size of each request;

generating a likelihood value from the machine-learned model based on the input, the likelihood value indicating a likelihood of gaining a performance benefit by applying a lazy materialization technique to the first task of the query;

comparing the likelihood value to a threshold value;

applying the lazy materialization technique to the first task based on the likelihood value meeting or exceeding the threshold value, and for a subsequent task of the query:

generating filter results for a previously performed task;

generating, based on the filter results, a likelihood value indicating a likelihood of gaining a performance benefit by applying the lazy materialization technique to the subsequent task;

comparing the likelihood value to a threshold value; and applying the lazy materialization technique to the subsequent task based on the likelihood value meeting or exceeding the threshold value.

2. The method of claim 1, wherein the machine-learned model is trained on a dataset of previous queries and a known run time for downloading columns of the previous queries.

3. The method of claim 1, wherein the machine-learned model is trained on a dataset of data characteristics including at least one of: a number of requests per column and a size of each column.

4. The method of claim 1, wherein the likelihood value corresponds to an estimated run time for applying the lazy materialization technique to the first task.

5. The method of claim 1, wherein the likelihood value is determined, in part, based on a size of a dictionary encoding of the column.

6. The method of claim 1, wherein the likelihood value corresponds to whether applying a filter to filter columns prior to downloading non-filter columns has a greater efficiency than a downloading both the filter columns and the non-filter columns prior to applying the filter to the filter columns.

7. The method of claim 6, further comprising:

applying an eager approach to a second task of the query based on the likelihood value being below a threshold value.

8. A system comprising:

at least one processor;

at least one memory comprising stored instructions, the instructions when executed cause the at least one processor to:

receive a request to perform a new query in a columnar database having a plurality of columns;

access, as a first task, a set of data based on the query, the set of data accessed based on identification of a value of interest to filter the plurality of columns;

generate an input to a machine-learned model based on the set of data, wherein the input comprises at least one of a number of files per task, a number of requests per row, and size of each request;

generate a likelihood value from the machine-learned model based on the input, the likelihood value indicating a likelihood of gaining a performance benefit by applying a lazy materialization technique to the first task of the query, wherein the machine-learned model is applied prior to executing the first task and without utilizing filter results from previously performed tasks of the query;

compare the likelihood value to a threshold value;

apply the lazy materialization technique to the first task based on the likelihood value meeting or exceeding the threshold value, and further comprising, for a subsequent task of the query, instructions that when executed cause the at least one processor to:

generate filter results for a previously performed task;

generate, based on the filter results, a likelihood value indicating a likelihood of gaining a performance benefit by applying the lazy materialization technique to the subsequent task;

compare the likelihood value to a threshold value; and apply the lazy materialization technique to the subsequent task based on the likelihood value meeting or exceeding the threshold value.

9. The system of claim 8, wherein the machine-learned model is trained on a dataset of previous queries and a known run time for downloading columns of the previous queries.

10. The system of claim 8, wherein the machine-learned model is trained on a dataset of data characteristics including at least one of: a number of requests per column, and a size of each column.

11. The system of claim 8, wherein the likelihood value corresponds to an estimated run time for applying the lazy materialization technique to the first task.

12. The system of claim 8, wherein the likelihood value is determined, in part, based on a size of a dictionary encoding of the column.

13. The system of claim 8, wherein the likelihood value corresponds to whether applying a filter to filter columns prior to downloading non-filter columns has a greater efficiency than a downloading both the filter columns and the non-filter columns prior to applying the filter to the filter columns.

14. The system of claim 13, wherein the at least one memory further comprises instructions that when executed causes the at least one processor to:

apply an eager approach to a second task of the query based on the likelihood value being below a threshold value.

15. A non-transitory computer readable medium comprising stored instructions encoded thereon that, when executed by a processor, cause at least one processor to:

receive a request to perform a new query in a columnar database having a plurality of columns;

access, as a first task, a set of data based on the query, the set of data accessed based on identification of a value of interest to filter the plurality of columns;

generate an input to a machine-learned model based on the set of data, wherein the input comprises at least one of a number of files per task, a number of requests per row, and size of each request;

generate a likelihood value from the machine-learned model based on the input, the likelihood value indicating a likelihood of gaining a performance benefit by applying a lazy materialization technique to the first task of the query, wherein the machine-learned model is applied prior to executing the first task and without utilizing filter results from previously performed tasks of the query;

compare the likelihood value to a threshold value; and apply the lazy materialization technique to the first task based on the likelihood value meeting or exceeding the threshold value, and further comprising, for a subsequent task of the query, instructions that, when executed by the processor, cause the processor to:

generate filter results for a previously performed task;

generate, based on the filter results, a likelihood value indicating a likelihood of gaining a performance benefit by applying the lazy materialization technique to the subsequent task;

compare the likelihood value to a threshold value; and apply the lazy materialization technique to the subsequent task based on the likelihood value meeting or exceeding the threshold value.

16. The non-transitory computer readable medium of claim 15, wherein the machine-learned model is trained on a dataset of previous queries and a known run time for downloading columns of the previous queries.

17. The non-transitory computer readable medium of claim 15, wherein the machine-learned model is trained on a dataset of data characteristics including at least one of: a number of requests per column and a size of each column.

18. The non-transitory computer readable medium of claim 15, wherein the likelihood value corresponds to an estimated run time based application of the lazy materialization technique to the first task.

19. The non-transitory computer readable medium of claim 15, wherein the likelihood value is determined, in part, based on a size of a dictionary encoding of the column.

20. The non-transitory computer readable medium of claim 15, wherein the likelihood value corresponds to whether applying a filter to filter columns prior to downloading non-filter columns has a greater efficiency than a downloading both the filter columns and the non-filter columns prior to applying the filter to the filter columns.

* * * * *